Feb. 17, 1925.
E. TOPHAM
VEHICLE BUMPER
Filed May 26, 1924
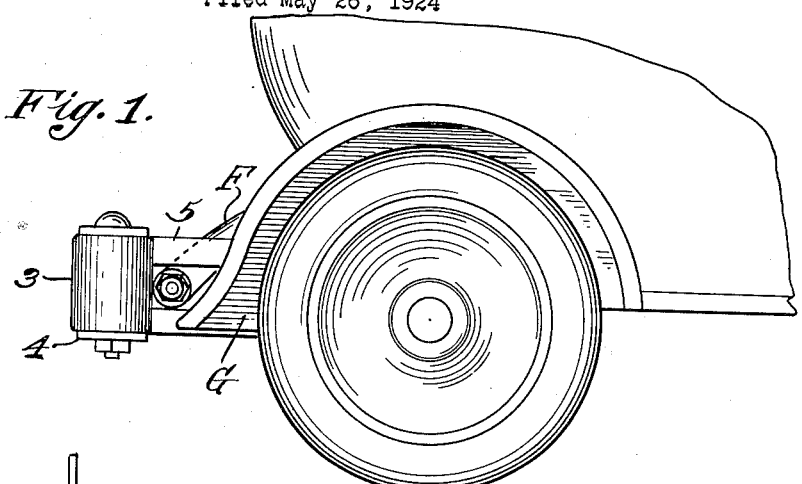
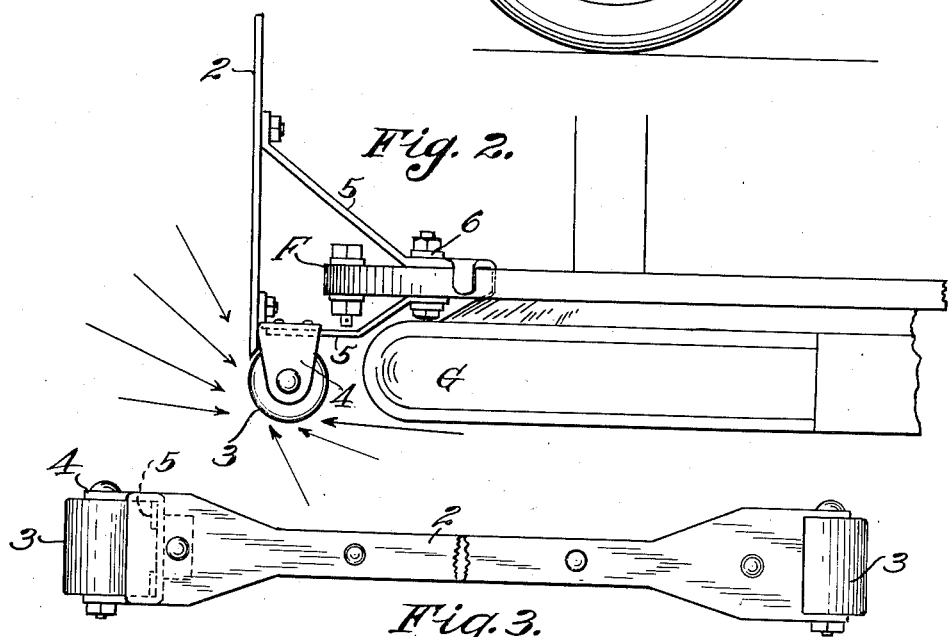
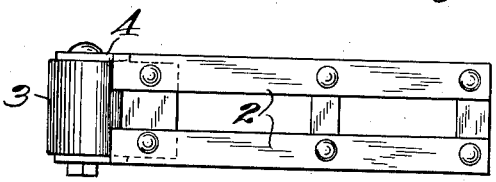
Inventor:
Edw. Topham.
By
Frederick E. Maynard
his Atty.

Patented Feb. 17, 1925.

1,526,725

UNITED STATES PATENT OFFICE.

EDWARD TOPHAM, OF SAN FRANCISCO, CALIFORNIA.

VEHICLE BUMPER.

Application filed May 26, 1924. Serial No. 715,886.

*To all whom it may concern:*

Be it known that I, EDWARD TOPHAM, a citizen of the United States, residing at San Francisco, California, have invented new and useful Improvements in a Vehicle Bumper, of which the following is a specification.

This invention relates to vehicles and more especially to protective devices for automobiles.

An object is to provide an automobile bumper designed not only to protect the exposed front and rear ends of the usual fenders or mud guards, but for the further purpose of facilitating the throwing off action of interfering structures by a rolling zone of contact, as when the bumper device may engage a high curb, a fence or wall, and especially to ward off a colliding or engaged vehicle. And an object is to reduce the tendency of hooking with an engaging foreign structure.

An object is to provide an end-roller bumper which may be readily adapted to various car frames and will not materially interfere with tightening up and greasing the vehicle parts in the usual manner.

Other objects and advantages will be made manifest in the following specification of apparatus of the invention as illustrated in the accompanying drawing, it being understood that further embodiments, modifications and adaptations may be resorted to within the spirit of the invention.

Fig. 1 is a side elevation of a portion of an automobile, showing an end view of the applied bumper.

Fig. 2 is a plan of an end part of the bumper.

Fig. 3 is an elevation or face view.

Fig. 4 is a face view of a plural bar form of bumper.

The apparatus shown has bumper bar or bars 2, of any shape and size, and they may extend from side to side or may be of the short, stub type as shown in Fig. 4 which illustrates plural bars while a single bar is depicted in Fig. 3.

Arranged at each outer end of the bumper bar structure is a vertical-axis, roller means 3, turning on a bearing 4, which may vary in form and kind according to the particular type of vehicle to which my improved bumper is to be adapted. Obviously also, the bumper will be secured to the frame F, by variant forms of brackets or braces 5.

The whole bumper structure is so constructed, designed and arranged as to support the rollers, which are cylindrical, in juxtaposition to the fenders or guards G. These, being the most exposed and less firmly supported part of the body, are readily crumpled in collision, and being highly finished, are badly scarred by an even light contact with a moving body, and can, in the better class of cars, be replaced only at an appreciable cost.

A roller device 3, is therefore placed as near a guard or fender end as is practicable, having in view the necessity for access to the frame horn and spring ends. The roller is disposed at about the outer side line of the near fender, as in Fig. 2, so as to encounter an obstacle approaching or approached by the fender end with a side-wiping, or oblique, or transverse path of movement, as shown by the arrows.

In the construction shown, the brace members 5, are so arranged and formed that ample clearance to the horn joints and shackles is had. Fastening bolts, clips or clamps 6, of any convenient or preferred form may be employed to mount the bumper.

The end of the bumper bar 2, is preferably set close and tangential to the periphery of the roller to prevent any hooking-in at and between the roller and the bar end. The rollers may be highly finished or cushion surfaced and in case of injury can be replaced at small expense as compared to a fender replacement.

What is claimed is:

1. A vehicle bumper comprising a guard roller setting in close juxtaposition to a mud fender, when the bumper is applied, so as to roll off an interfering obstacle approached by or approaching the fender, and journal means for mounting the roller in situ to turn on a vertical axis at the lateral extremity of the bumper.

2. An automobile bumper comprising a bracket adapted for attachment to an automobile frame, and rollers having vertical journals in said bracket and each having its periphery exposed in juxtaposition to the end of a mud fender of the automobile to roll off impinging obstacles moving from the fender end toward the near roller.

3. An automobile bumper comprising a bracket structure for attaching the bumper, bumper bar means on the bracket, and a rolling means disposed, when the bumper is mounted, in juxtaposition to a fender end, to guard the same and being mounted on the bracket structure of the bar.

4. An automobile bumper comprising a bracket structure for attaching the bumper, bumper bar means on the bracket, and rollers journalled on and exposed at the remote ends of the bumper for rolling off encountered obstacles at the ends of the fenders.

5. An automobile bumper comprising a bracket structure for attaching the bumper, bumper bar means on the bracket, and a rolling means including cylindrical elements, the bar means terminating close and tangentially to the said elements.

6. An automobile bumper including a bracket structure, and a rotative device journalled on the extreme end of the bracket structure so as to be disposed adjacent a fender end; the device having a portion of its face exposed near the fender and also its outer lateral face exposed to impinge obstacles and guard the fender.

7. An automobile bumper including a bracket structure terminating within the outside line of a fender when the bumper is in place, and a rotative guard vertically journalled in said bracket and having its periphery exposed laterally and rearwardly of the fender.

8. An automobile bumper structure including a rotative guard journalled on a vertical axis and being disposed close to the end of a fender and exposed so as to engage obstacles relatively moving in either forward or rearward direction along the side of the fender.

9. An automobile bumper including a bracket structure having a rotative guard exposedly mounted in its lateral outboard extremity to impinge obstacles at said extremity.

EDWARD TOPHAM.